Jan. 31, 1933.   O. NORLING   1,895,640
CLAMP TRUCK
Filed March 25, 1932   2 Sheets-Sheet 1
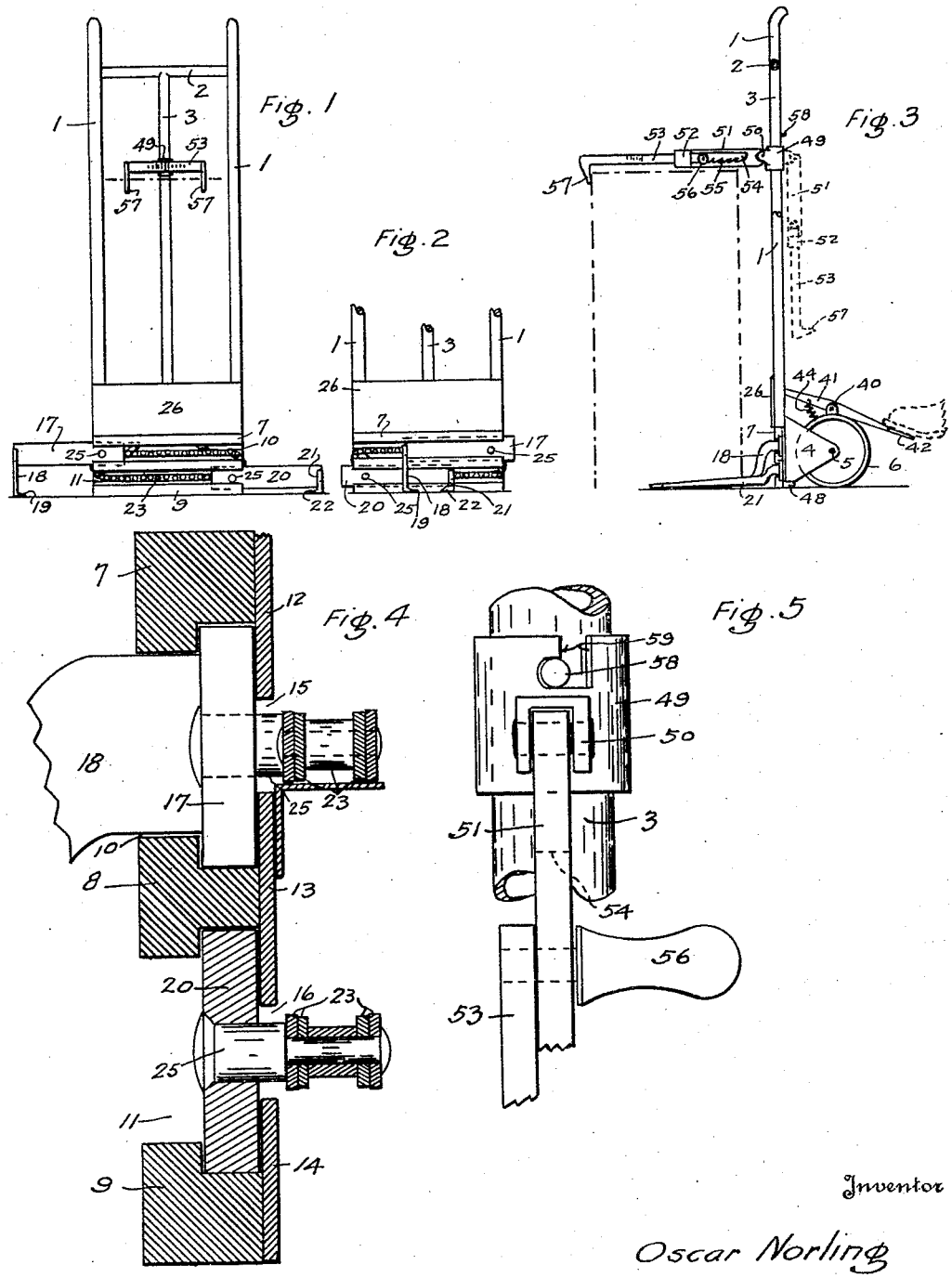
Inventor
Oscar Norling
By
Attorney Jan. 31, 1933.  O. NORLING  1,895,640
CLAMP TRUCK
Filed March 25, 1932  2 Sheets-Sheet 2

Inventor
Oscar Norling
By
Attorney

Patented Jan. 31, 1933

1,895,640

UNITED STATES PATENT OFFICE

OSCAR NORLING, OF TACOMA, WASHINGTON

CLAMP TRUCK

Application filed March 25, 1932. Serial No. 601,143.

My invention relates to wheeled hand trucks adapted for use in warehouses, and other places, for the handling of merchandise, especially when packaged, and has special reference to trucks which engage the load under its ends, and which are adjustable to engage any loads, independent of their width, within the capacity of the truck.

The objects of my invention are to provide:—means whereby a very large degree of adjustability of the lifting spurs may be had; improved means for attaching the two lifting arms together whereby they are given complementary motion; foot-operated means for actuating said connecting means whereby said lifting arms are moved; swivel means in said foot-operated means whereby said load lifting arms may be moved in either direction thereby; means for locking said load-lifting arms against spreading when in use; means for disengaging said locking means when the truck is in position for releasing or receiving a load; and adjustable means for causing a load to tip back on to the truck when the truck is tipped backward for transporting the load.

I attain these and other objects by the devices, mechanisms, and arrangements illustrated in the accompanying drawings, in which—

Figure 6:
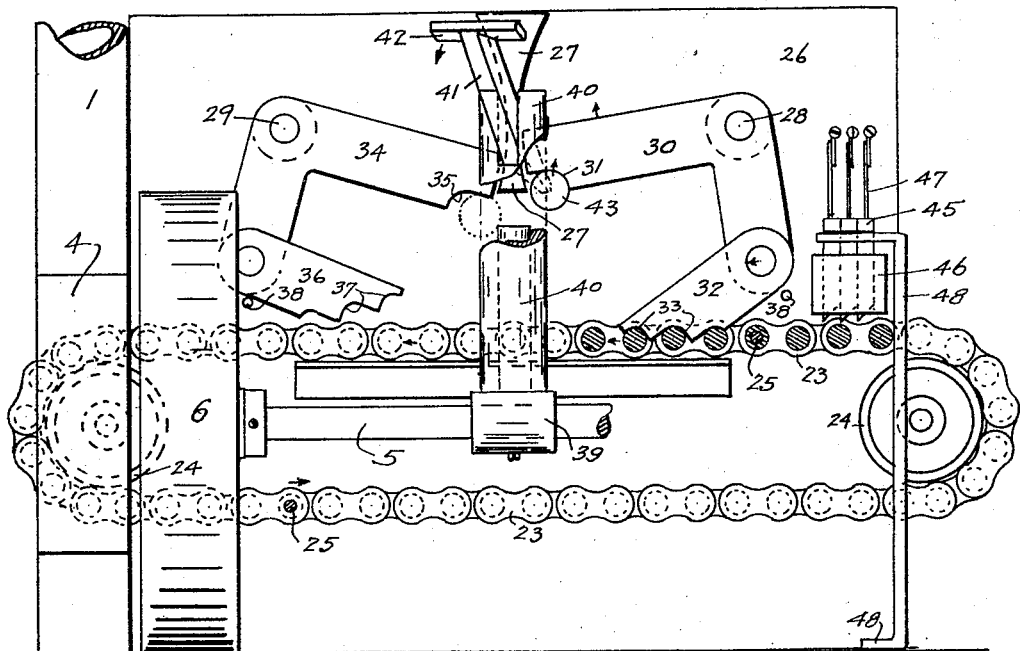
Figure 7:
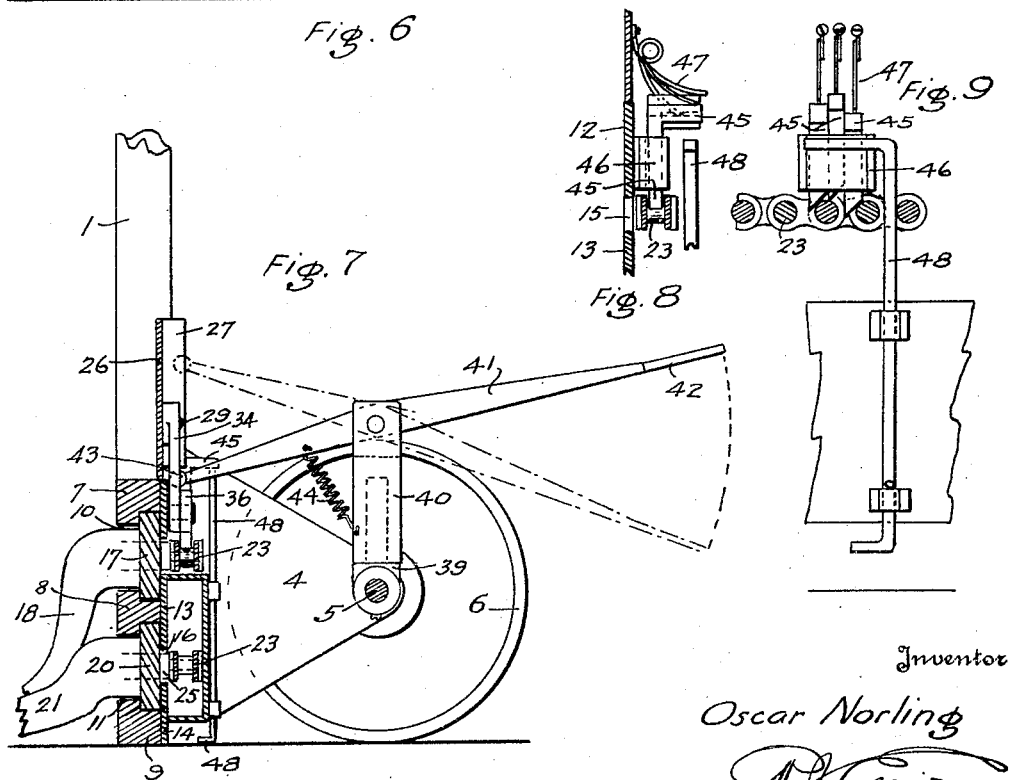
Figure 8:
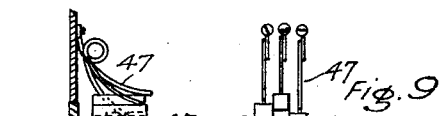
Figure 9:
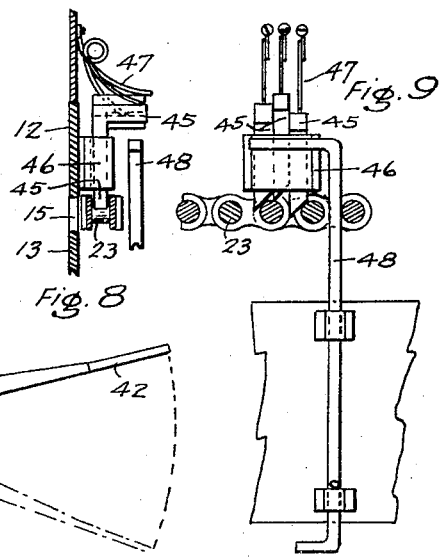

Fig. 1 is a front elevation of my improved hand truck, showing the lifting spurs extended laterally to their extreme outward positions; Fig. 2 is a partial similar view with the spurs retracted to their extreme inward positions; Fig. 3 is a side elevation thereof; showing the load in broken lines to illustrate the action of the load hook; Fig. 4 is a vertical section of the front plate of the truck, showing the slides carried thereby and the chain connecting the slides together; Fig. 5 is a rear elevation of a portion of the central bar of the truck, showing the load hook hung in inoperative position thereon; Fig. 6 is a rear elevation of the lower end of the truck, parts thereof being removed or broken away to reveal the construction and operation of the parts thereof, the locking means being shown in inoperative position; Fig. 7 is a vertical section thereof; Figs. 8 and 9 are side views of the automatic lock in operation.

Similar numerals of reference refer to similar parts throughout the several views.

My improved hand truck comprises a frame formed of two side bars 1, forming the handles thereof, joined together at their upper ends by a cross bar 2, and at their lower ends by the carrier plate. A central bar 3 extends from the carrier plate to the cross bar 2 between the two said handle or outside bars 1. The carrier plate is provided with a pair of brackets 4 carrying a horizontal axle 5, extending across the truck and positioned a short distance to the rear of the carrier plate. The axle 5 is provided with two truck wheels 6 rotatably mounted thereon but prevented from lateral motion along the axle.

The carrier plate is divided into three sections 7, 8 and 9 by means of two parallel undercut slots 10 and 11. Plates 12, 13 and 14 are secured to the rear side of the plates 7, 8 and 9 and are separated by two narrower slots 15 and 16. A carrier slide 17 is mounted in the upper slot 10 and is adapted to move laterally across the truck therein. This carrier slide 17 has an arm 18 extending forward from the extreme outer end thereof, passing forward through the slot 10 and then downward to the level of the floor, and is provided with an inward-extending carrier spur 19 at its end, said spur being adapted to pass under the end of the package to be lifted. A similar slide 20 is mounted in the lower slot 11 and is adapted to move laterally therein, and carries an arm 21 extending forward through the slot 11 from the extreme outer end thereof, and then passing downward to the level of the floor and is provided at its end with a spur 22 complementary to the spur 19. The slides 17 and 20 are secured to each other through the medium of an endless sprocket chain 23 which is mounted on two wheels 24 mounted on the rear side of the carrier plate. The upper and lower parts of the sprocket chain 23 lie parallel with and opposite to the two above-described slots 15 and 16. A bolt or pin 25 secures each of the slides 17 and 20 to the chain, at complementary parts thereof, by having a portion thereof forming the rivet between the links of the chain, and this pin 25 passes through the slot 15 or 16. Thus, when the chain is moved in either direction, it moves the upper slide 17 in one direction and the lower slide 20 in equal degree in the opposite direction. The pins 25 are secured to the said slides 17 and 20 at points closely adjacent their extreme inner ends. These pins 25 can travel a distance equal to the distance between the centers of the wheels 24, as illustrated in Figs. 1 and 2, and therefore the load arms 18 and 21 move an equal extent in each direction and the range of their movement is twice the said distance.

Referring, now, particularly to Figs. 6–9 wherein the means for operating and locking the chain 23 are illustrated. A plate 26 extends across the truck, above the carrying plate and is provided with a vertically and centrally positioned guide lug 27 extending from its rear face, the side edges of said lug being curved on the arcs of two circles centered in the following described ratchet fulcrums 28 and 29. The right-hand fulcrum 28 mounts a bell-crank lever 30, one arm of which extends adjacent the right-hand curved edge of the above-described guide lug 27, and is provided at its outer lower corner with a notch 31, adapted to receive the ball-shaped head of the operating lever. The other arm of the lever 30 is pivotally attached to an operating pawl 32 whose lower surface is adapted to contact with the upper part of the chain 23, and is provided with a series of notches 33 adapted to engage contiguous links thereof to actuate them. The pawl 32 extends from the end of the lever 30 towards the center of the truck and, as illustrated in the drawings, is adapted to move the chain to draw the load arms 18 and 21 towards each other. The other fulcrum 29 is similarly positioned on the other side of the guide lug 27 and carries a similar but oppositely formed bell-crank lever 34, notched at 35 and carrying a pawl 36, provided with chain-engaging notches 37, and is adapted to engage and operate the chain in the opposite direction to move the load arms laterally outwardly. When the said levers 30 and 34 are in inoperative positions the pawls 32 and 36 are drawn outward and their lower edges engage the stops 38 and are raised thereby out of engagement with the chain 23. The above-described axle 5 is provided with a central boss 39 on which the fulcrum post 40 of the pedal mechanism is mounted in such manner that it may freely swivel thereon. The post 40 carries a foot-lever 41 pivoted to its upper end. This lever 41 is provided with a foot plate 42, at its rear end, and with a ball-shaped head 43 at its forward end. A spring 44, mounted between the foot-lever 41 and the post 40 always tends to pull the head 43 down into inoperative position. The head 43, when in this inoperative position, may be swung in either direction below the guide lug 27 and into engagement with either notch 31 or 35 by simply placing the foot on the foot-plate 42 and moving it towards the left or right, thus swinging the post 40. If it is desired to open the clamp truck, the foot plate 42 is moved towards the right to bring the head 43 into the notch 35 of the lever 34; then, on pressing down on the plate 42, the head 43 moves upward along the left side of the fixed lug 27, by which it is held in the notch 35. By reciprocating the foot lever 41, the chain 23 is moved to separate the load arms 18 and 21. Similarly, by moving the foot plate 42 towards the left, the head 43 passes under the lug 27 and enters the notch 31 of the lever 30, and the lever 30 may be actuated to move the chain 23 to draw the load arms 18 and 21 towards each other.

A plurality of locking dogs 45 are loosely mounted in a frame 46. Each of these dogs 45 comprises an inverted-L-shaped body whose upper end extends rearward from above the frame 46 and whose lower end extends downwardly. These lower ends are positioned to drop between the side bars of the chain links and to engage the cross bars thereof. These dogs 45 are bevelled on their lower ends to permit the chain to move in the direction to draw the load arms 18 and 21 towards each other but to engage the cross members of the chain with their vertical faces to prevent it from being moved in the opposite direction. A plurality of these dogs are provided so that only a very small outward or spreading movement of the arms 18 and 21 is permitted, in spite of the fact that the links of the chain are of comparatively large size. Springs 47 engage the several dogs 45 to force them downward into contact with the chain. However, when there is no load on the truck, it is desirable to move the load arms apart in order to grip the new load, and therefore I have provided an unlocking bar 48 which is vertically slidably mounted on the truck and is adapted to engage the floor when the truck is tipped forward into loading or unloading position (Figs. 3 and 6). This bar 48 is bent to pass under the rearward extending upper ends of all the dogs 45 and to engage and lift them when its lower end is supported by the floor, but to permit them to drop from such raised position into locking contact with the chain as soon as the truck is tipped backward to raise the end of the bar 48 off the floor and to transport the truck on its wheels 6.

Referring now to Figs. 1, 3, and 5, it will be seen that the central bar 3 of the truck is provided with a loose collar 49 carrying a bifurcated lug 50 to which a bar 51 is pivotally secured. This bar 51 carries a sleeve 52 secured to its end, through which the extensible bar 53 passes. The bar 51 is provided with a slot 54 having teeth 55 in its lower side. The extension bar 53 is provided with an operating handle 56 which passes through the slot 54 and is adapted to engage any of the teeth 55 therein to hold it against further extension. The outer end of the bar 53 is provided with two prongs 57 adapted to engage over the outer edge of the package being handled. A pin 58 extends from the rear side of the bar 3 and the collar 49 is provided with a suitable slot and notch 59 adapted to receive the said pin 58 and thus to hold the collar 49 in its uppermost position when the whole apparatus has been turned to lie on the rear side of the truck in its inoperative position. As soon as it is to be used the collar 49 is disengaged from the pin 58 and is turned to bring the bars 51 and 53 on the front side of the truck and they are then lifted to pass over the package. The handle 56 is disengaged from the teeth 55 and the outer bar 53 is slid through the sleeve 52 to bring the prongs 57 into contact with the edge of the package, the handle 56 is then pushed down into engagement with the teeth and the package is thus secured in place against tipping in handling.

It is to be understood that I do not wish to confine myself to the particular parts shown in the drawings and described in the above specification, but that changes may be made therein without departing from the spirit of my invention as outlined in the appended claims.

Having described my invention, what I claim and desire to secure by Letters Patent, is—

1. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; and means for operating said carrier slides, said means being attached to each said carrier slide and adapted to permit the connections with the carrier slides to pass each other.

2. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; and means for operating said carrier slides, said means being adapted to move each carrier slide substantially the entire width of the truck.

3. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; means for operating said carrier slides; and means, engaging said operating means, and adapted to lock it against outward movement of said carrier arms.

4. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; means for operating said carrier slides; means engaging said operating means, and adapted to lock it against outward movement of said load arms; and means, carried by the truck and adapted to engage the floor when the truck is in inoperative position, whereby said locking means is rendered inoperative when the truck is in inoperative position.

5. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; an endless linked chain mounted on said truck and lying parallel with and adjacent to said carrier slides; means attaching two opposite points in said endless chain to the inner ends of said carrier slides; and means adapted to actuate said chain to move said carrier slides.

6. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; an endless linked chain mounted on said truck and lying parallel with and adjacent to said carrier slides; means attaching two opposite points in said endless chain to the inner ends of said carrier slides; and ratchet means engaging the links of said chain to actuate the chain in one direction.

7. In a clamp truck, the combination of a carrying plate having two parallel grooves extending across its face, one above the other; carrier slides mounted in said grooves; load arms extending forward and downward from the outer ends of said carrier slides, and adapted to engage the ends of the load to be lifted; an endless linked chain mounted on the truck and lying parallel with and adjacent to said carrier slides; means attaching two opposite points in said endless chain to the inner ends of said carrier slides; a pair of oppositely acting ratchet means, each engaging the links of said chain to actuate the chain in opposite directions; and a selective pedal means adapted to engage and actuate either of said ratchet means.

8. In a clamp truck, the combination of a plate having grooves therein; carrier slides mounted in said grooves and provided with means to engage the load to be lifted; an endless linked chain mounted on the truck; means attaching two oppositely moving points of said chain to said carrier slides; a central fixed guide lug; a pair of ratchet levers pivotally mounted on opposite sides of said lug, the end of each said lever lying adjacent to said lug and provided with a notch in its lower corner; ratchet means attached to each said ratchet levers, engaging said chain, and adapted to actuate it in opposite directions; a swivel fulcrum post; a foot lever mounted thereon, the head of said lever being adapted to pass below said lug and to enter either of the notches in said ratchet levers, said head being held in the notch while in motion by said lug and being adapted to actuate the ratchet lever.

This 18th day of March, 1932.

OSCAR NORLING.